US012754812B2

(12) United States Patent
Kumar et al.

(10) Patent No.: US 12,754,812 B2
(45) Date of Patent: Oct. 6, 2026

(54) SECURE DEBUG ACCESS OF A SYSTEM-ON-CHIP DEVICE

(71) Applicant: NXP USA, Inc., Austin, TX (US)

(72) Inventors: Surender Kumar, Noida (IN); Pradip Singh, Noida (IN); Fabrice Poulard, Houilles (FR); Stefan Doll, Munich (DE)

(73) Assignee: NXP USA, Inc., Austin, TX (US)

( * ) Notice: Subject to any disclaimer, the term of this patent is extended or adjusted under 35 U.S.C. 154(b) by 119 days.

(21) Appl. No.: 18/954,865

(22) Filed: Nov. 21, 2024

(65) Prior Publication Data

US 2026/0093586 A1 Apr. 2, 2026

(30) Foreign Application Priority Data

Sep. 30, 2024 (IN) ............................ 202441073624

(51) Int. Cl.
*G06F 21/00* (2013.01)
*G06F 11/263* (2006.01)

(52) U.S. Cl.
CPC .................................. *G06F 11/263* (2013.01)

(58) Field of Classification Search
CPC .... G06F 11/263; G06F 21/44; G06F 21/6218; H04L 63/102; H04L 63/08
See application file for complete search history.

(56) References Cited

U.S. PATENT DOCUMENTS

| | | | | |
|---|---|---|---|---|
| 9,633,185 | B2 * | 4/2017 | Shin | G06F 21/602 |
| 10,003,467 | B1 * | 6/2018 | Miller | H04L 9/3268 |
| 10,254,337 | B2 * | 4/2019 | Zhang | G06F 11/3656 |
| 2018/0196949 | A1 * | 7/2018 | Park | H04L 9/0869 |
| 2021/0365557 | A1 * | 11/2021 | Chokshi | G06F 11/3648 |
| 2024/0031158 | A1 * | 1/2024 | Neve De Mevergnies | H04L 9/3226 |
| 2025/0377992 | A1 * | 12/2025 | Nasim | G06F 11/2051 |

FOREIGN PATENT DOCUMENTS

WO WO-2025163282 A1 * 8/2025 ......... G06F 12/1009

OTHER PUBLICATIONS

Backer et al., "On enhancing the debug architecture of a system-on-chip (SoC) to detect software attacks," 2015 IEEE International Symposium on Defect and Fault Tolerance in VLSI and Nanotechnology Systems (DFTS), Amherst, MA, USA, pp. 29-34, (Year: 2015).*

Lee, Kuen-Jong et al., "A Secure JTAG Wrapper for SoC Testing and Debugging", IEEE Access, Apr. 4, 2022, 10 pages.

* cited by examiner

*Primary Examiner* — Morshed Mehedi

(57) ABSTRACT

A system and method include receiving, by a security controller of a system-on-chip and from a controller of the system-on-chip, an indication that a debugger computing device is connected to a debug port of the system-on-chip. A user debug authorization key and a user debug profile are received and verified by the security controller. The user debug profile identifies a set of requested resources. A configuration of the system-on-chip is modified to allow the debugger computing device to access resources of the set of requested resources.

20 Claims, 7 Drawing Sheets

SECURE DEBUG ACCESS OF A SYSTEM-ON-CHIP DEVICE

CROSS-REFERENCE TO RELATED APPLICATIONS

This application claims the priority under 35 U.S.C. § 119 of Indian Patent Application No. 202441073624, filed on 30 Sep. 2024, the contents of which are incorporated by reference herein in its entirety.

TECHNICAL FIELD

The present disclosure generally relates to secure debug access of system-on-chip cores and, more specifically, to secure debug access of system-on-chip cores and other components.

BACKGROUND

A system-on-chip (SoC) is an integrated circuit that can incorporate various system functionalities into a single package. An SoC for automotive applications, for example, integrates the various functionalities of a vehicle, like the infotainment system, management systems, driver assistance features, vehicle safety systems, vehicle engine management, etc. on to a single chip. These systems sometimes is comprised of various components comprising memory systems and processing cores. These components may be associated with different manufacturers or suppliers, whose proprietary technologies are incorporated into that single SoC.

There are instances in which various owners wish to access portions of the SoC to debug, test, validate or otherwise analyze their proprietary code and functions. Typically, in the past, a supplier looking to debug their SoC would connect a debugger device to a debug port located on the SoC and receive, through that port, access to all data stored on the SoC as well as necessary diagnostic information. In circumstances where multiple suppliers are associated with different functions within the SoC, an uncontrolled debug operation therefore results (e.g., through data dumped as part of the debug operations) in one supplier gaining access to the proprietary information of another supplier. Therefore, it may be beneficial to enable authorized suppliers to utilize a secure debug function that enables a particular supplier to only access SoC cores, memory files, and other data associated with the specific functions implemented by that supplier within the SOC to protect against unauthorized access and misuse of other supplier data.

SUMMARY

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

In some aspects, the techniques described herein relate to a system-on-chip device, including: a memory configured to store a cohort definition that identifies for each user of a plurality of users a subset of a set of resources of the system-on-chip that the user is authorized to access; a controller; a debug port configured to communicate, via a wired connection or a wireless connection, with a debugger computing device; a bus interconnect coupled to and configured to communicate data to the memory, the controller and the debug port; and a security controller coupled to the bus interconnect, wherein the security controller is configured to: receive, from the controller, an indication that the debugger computing device is connected to the debug port, receive, from the debug port, a user debug authorization key from the debugger computing device, determine, using the user debug authorization key, that the debugger computing device is associated with a first user of the plurality of users, receive, from the debug port, a user debug profile, wherein the security controller is configured to verify an authenticity of the user debug authorization key and the user debug profile by cryptographic operation, determine, using the user debug profile, a set of resources requested by the user, determine, using the cohort definition, that the set of requested resources includes resources associated with the user in the cohort definitions, and modify a configuration of the system-on-chip to allow the debugger computing device to access resources of the system-on-chip that are in the set of requested resources and to disallow the debugger computing device access to resources of the system-on-chip that are not in the set of requested resources based on the determination that the set of requested resources includes resources associated with the user in the cohort definitions using the cohort definition.

In some aspects, the techniques described herein relate to a system-on-chip device, including: a memory configured to store: a user identification for each user of a plurality of users; a cohort definition that identifies for each user of the plurality of users a subset of a set of resources of the system-on-chip that a corresponding user is authorized to access; a system-on-chip unique identifier; and a key catalog that includes authorization keys associated with each subset of resources of the system-on-chip for each user of the plurality of users; a controller; a debug port configured to communicate, via a wired connection or a wireless connection, with a debugger computing device; a bus interconnect coupled to the memory, the controller, and the debug port; and a security controller coupled to the bus interconnect, wherein the security controller is configured to: receive, via the debug port, an authorization key corresponding to a request to access a set of resources of the system-on-chip device; determine, using the key catalog stored in the memory, that the authorization key corresponds to at least one of the authorization keys of the key catalog; and modify a configuration of the system-on-chip to allow access to resources that are in the set of requested resources and to block access to resources of the system-on-chip that are not in the set of requested resources based on the determination.

In some aspects, the techniques described herein relate to a method, including: receiving, by a security controller of a system-on-chip and from a controller of the system-on-chip, an indication that a debugger computing device is connected to a debug port of the system-on-chip; receiving, via the debug port, a user debug authorization key from the debugger computing device; determining, using the user debug authorization key, that the debugger computing device is associated with a first user of a plurality of users; receiving, via the debug port, a user debug profile, wherein the user debug authorization key and the user debug profile are verified as authentic by the security controller of the system-on-chip; determining, using the user debug profile, a set of requested resources of the system-on-chip; determining, using a cohort definition, that the set of requested resources includes resources associated with the first user of the plurality of users in the cohort definitions; and modifying a configuration of the system-on-chip to allow the debugger to access resources of the set of requested resources that are in the set of requested resources and to disallow the debugger access to resources of the system-on-chip device that are not in the set of requested resources based on the determination that the set of requested resources includes resources associated with the first user of the plurality of users in the cohort definitions using the cohort definition.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE ILLUSTRATED EMBODIMENTS

Figure 1:
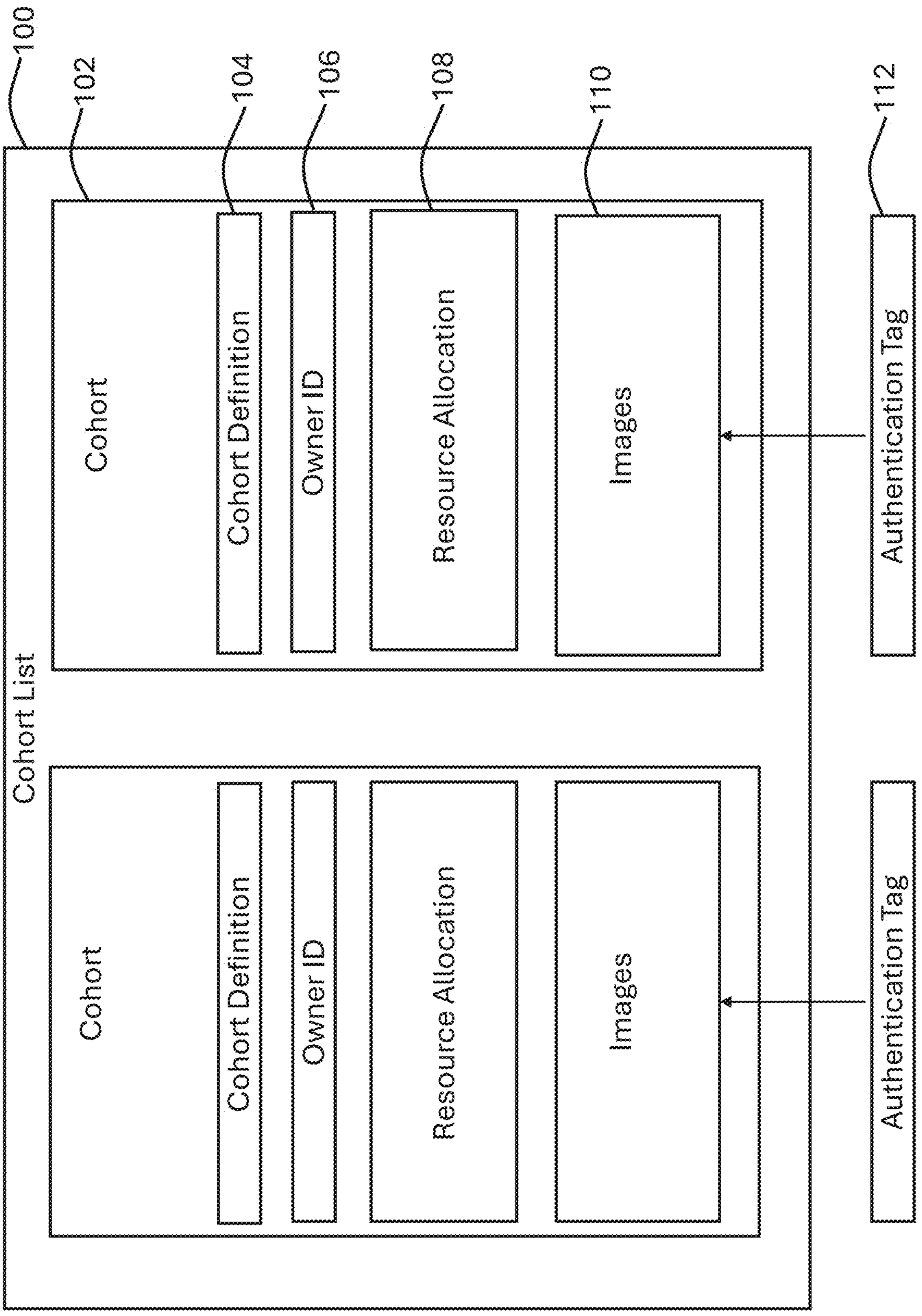
FIG. 1 shows a simplified block diagram of a cohort list.

In general, the embodiments described herein provide for the method of enabling secure access to the cores, resources and memory of a system-on-chip (SoC) where the various cores have different owners or suppliers (referred to herein as a user or owner) and authorization and authentication keys are assigned in order to protect proprietary information as between owners and third parties. As used in the present disclosure an owner can mean the designated vendor, supplier, manufacturer, company, or individual, of an allocated cohort or cohorts, meaning a specific grouping of resources of the SoC. In an exemplary application, the owner can be the entity authorized to debug particular resources and access a set of proprietary data of the SoC based on the designated allocation of resource. Further, the designated allocation of resources represents a cohort or core of the SoC that is configured to implement, for example, vehicle infotainment functions, vehicle safety functions, or vehicle management functions In one or more embodiment, access to various component of the SoC can be granted to the authorized users and denied to all the other related third parties on a multi-owner SoC. Specific processor cores within the SoC can be associated with particular authorized users via a provisioning contract or some other form of security data that can be provided to a security engine on the SoC. The SoC can then use that provisioning contract, as described herein, to provide that authorized users can only access the processor cores and associated memory with which the authorized user is associated in the provisioning contract.

For an SoC where the device resources are shared amongst components with multiple different suppliers there may be a variety of companies, individuals, competitors, vendors or other entities who require access to the different components in order to debug or otherwise analyze the operations of the SoC that affect their respective systems. In accordance with the present disclosure, in these conditions, a data table can be created that designates which authorized users can access which SoC components. As such, that data table determines the division of SoC resources amongst the various authorized users.

At a high-level, an SoC may consist of a control unit, one or more memories, a security controller having a variety of subsystems to control access to and data flow into, through, and out of the SoC, a variety of any number of peripherals and bus interconnects or data networking system to interconnect the various functional blocks of the SoC. In various circumstances, different components of the SoC may be designed and implemented by different suppliers such that the supplier is responsible for the entire component. Other systems, however, such as the security controller and the memory connected to these subsystems can shared amongst and used by functionalities provided by the different suppliers. Within the memory storage of the SoC, stored data may consist of personal or proprietary data that the various suppliers may not want other parties or other suppliers to access. In order to ensure the protection of this data, while still providing access to authorized owners, as described in the present disclosure the SoC can be partitioned in the described manner to provide access to only that supplier's data and none others.

Once, as described below, a configuration table designating which suppliers should have access to which SoC components is determined and encoded into a memory of the SoC, the data is stored for future authentication operations by the security controller of the SoC. Following that, a specific supplier authorization key is assigned to each supplier and are provided to the security controller of the SoC. Additionally, an owner card authentication key can be assigned and provided to the security controller. The owner card authorization key is associated with specific components, CPU, memory, peripherals, etc. that belong to the associated supplier, as described below.

With these values and security keys stored in a memory accessible to the SoC's security controller, during a debug operation, once a debugger computing device (also referred to as simply a "debugger") is connected to the SoC and a particular supplier has been authenticated via that supplier's authorization key, the supplier, as an authorized user, may perform various tests and access certain data of the SoC, as desired, however, the SoC is configured to limited the authorized user to access only their agreed-to portions of the SoC (e.g., specific cores, functionality, and memory).

Within the SoC, therefore, the security controller and the bus interconnect act in conjunction to provide or deny access to components not authorized for access. Access rules can be defined, again by the agreement and stored within the security controller of the SoC, to ensure the protection of third party data. When, however, the supplier authentication key is verified and the card authentication key is provided and validated, the bus interconnect of the SoC can block access to any blocks containing proprietary or confidential information thereon that the authorized user is not allowed to access.

Using the present system, therefore, in a setting where a particular supplier of one or more functions within an SoC wishes to connect a debugger or some other external device to the SoC to access data stored therein, that supplier should have access to its data and cores, without being able to access data or core functionality associated with other suppliers. Therefore, upon connecting the debugger, the security controller will confirm the debugger is authorized to open a session. Typically, this involves the supplier loading their specific authentication key into the debugger that, when connected to the SoC transmits to the authentication key to the security controller of the SoC. If the authentication key is validated, the security controller of the SoC retrieves the debug profile for that supplier. The card will be checked and confirmed with regards to what specific areas of the SoC memory and cores and the SoC control unit enables the debugger to access those resources. The control unit prevents the debugger from accessing other memory or cores that are not accessible to the supplier.

In defining the access granted to each supplier, in accordance with the present disclosure, a cohort list is defined. The cohort list is, in general, a data table that defines, for each supplier, the various SoC resources and components that are accessible to the supplier. To illustrate, FIG. 1 shows a simplified block diagram of a cohort list 100. The cohort list 100 can represent all of the resources available to the SoC and how they can be divided amongst the various suppliers of the chip's resources. Therefore, the cohort list 100 can represent a logical grouping of the resource allocation, wherein the grouped resource can serve a common purpose. For example, a group or subset of the SoC's resources, including a controller, a memory block, a peripheral and etc. can be allocated to supporting a vehicle infotainment system. The cohort list 100 contains a plurality of cohorts 102 each having a variety of elements to make them unique as between each other. The cohort 102 can be the actual division of the device's resources. A cohort 102 can first have a cohort definition or cohort identifier 104 and each cohort identifier 104 corresponds to an owner identifier 106. Also defined within the cohort list 100 is the resource allocation 108 that can contain the list of the resources or subset of resources corresponding to that specific cohort 102. The resource allocation 108 can be associated with any variety of elements available on the chip, including the central processing unit (CPU), the memory, peripherals, security, bus interconnects, systems and subsystems, clocks and a variety of other semiconductor circuit elements. The resource allocation 108 along with other elements described within the present disclosure can be utilized by the security and interconnect elements to allow or deny access to the various owners whenever access is requested. Additionally, the cohort list 100 can comprise a set of start-up images 110, which may or may not include authentication tags 112, which may be utilized to determine an authenticity and integrity of the start-up images 110.

The cohort definition 104 can be a unique identifier that is not shared between the different cohorts. In other words, it can be associated with only one cohort. The owner identifier 106 can be specific to each owner amongst the shared suppliers of the SoC and can be used to identify the subset of resources that the owner is authorized to use or access. Therefore, there may be multiple cohorts having the same cohort identifier 104, as an owners may own or be responsible for more than one cohort 102. Those cohorts of the owners may be a shared system or subsystem or totally unique from each other.

The start-up images 110 can be defined as a component of the boot process of the cohort list 100. The start-up images 110 can include a set of code or data that every core or component of the cohort 102 can contain with instructions and information regarding initialization for each core or resource within the cohort 102. Each cohort 102 can have a set of start-up images 110 corresponding to the resource allocation 108 or system cores that are associated with the cohort 102. Wherein, the start-up images 110 can be generated by a controller at start-up to define a booting mechanism for each core or resource.

Once defined, the cohort list 100 can be installed into a particular SoC to provide access control during a debugging operation, as described herein.

Figure 2:
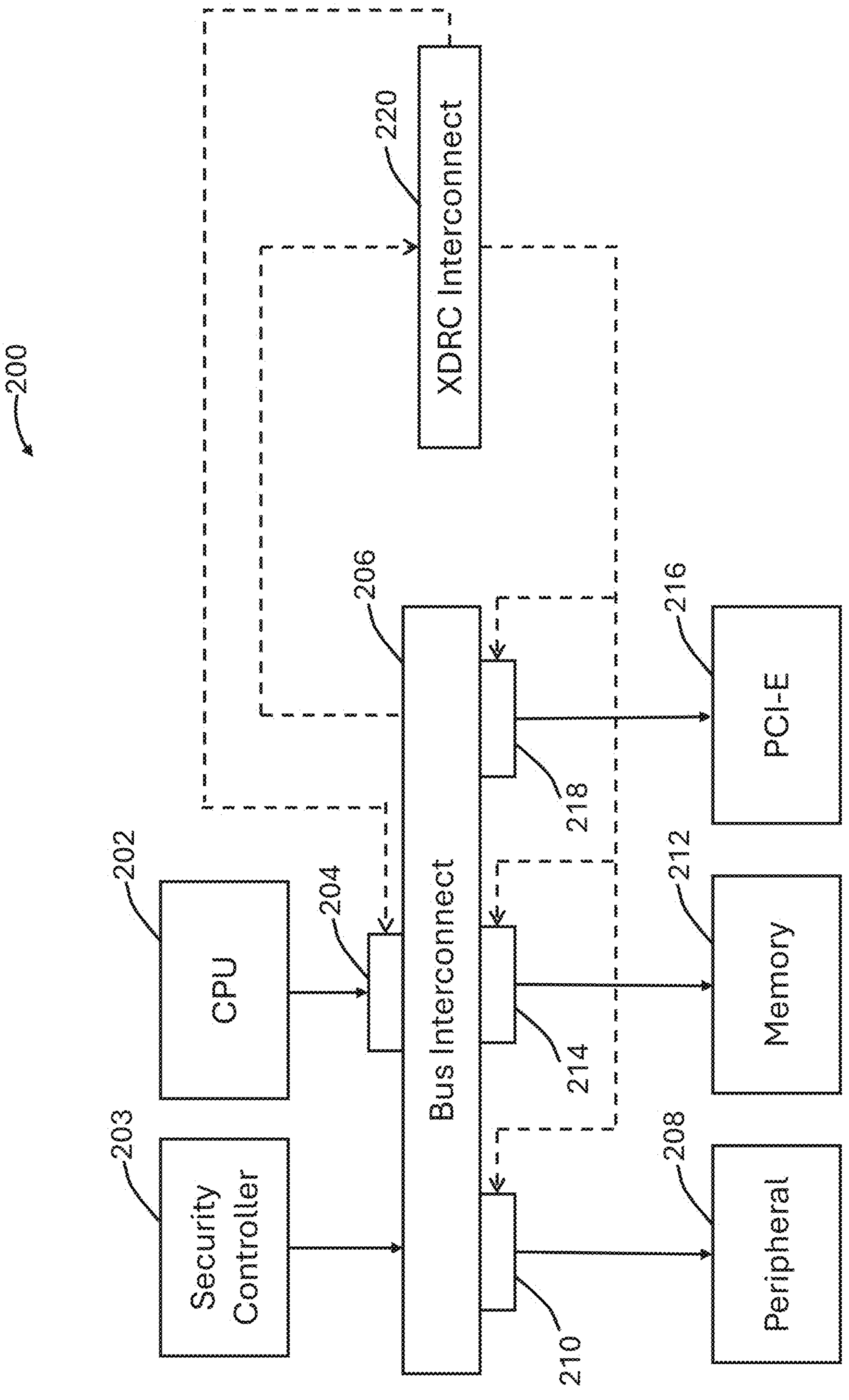
FIG. 2 shows a simplified block diagram of a system-on-chip (SoC) circuit.

To illustrate, FIG. 2 shows a simplified block diagram of SoC 200. The SoC 200 can be comprised of a CPU 202, that can be connected to the bus interconnect 206 via an access identifier 204. The bus interconnect 206 can be further connected to a peripheral 208 or set of peripheral blocks via a peripheral ID access control 210. The peripherals may be a variety of systems or subsystems connected to the SoC. For example, if the SoC were for a vehicle, the peripherals might include a connection to a vehicle sound system, an infotainment system, controls for various motors for the windows, seats and etc., systems that control the engine or transmission, and any other of a number of systems found on a vehicle that requirement an electronic control unit (ECU).

Security controller 203 can be connected to the bus interconnect 206 and thereby to the other components of the system-on-chip 200 device. The security controller 203 can act as an engine to perform a variety of verification and authentication functions for the system-on-chip by the application of appropriate cryptographic operations on the various security keys (e.g., identification keys and debug profile keys) of system-on-chip 200.

The bus interconnect 206 can be further connected to a memory 212 or set of memory blocks via a memory ID access control 214. The memory 212 may be composed of any number of types of memory storage devices typically utilized on a vehicle ECU. For example, the memory 212 may be a flash memory, a random access memory (RAM), an electrically erasable programmable read-only memory (EEPROM), a read-only memory (ROM), a cache memory, any combination thereof and etc. The bus interconnect 206 can be further connected to a peripheral component interconnect express (PCI-E) 216 via a file ID access control 218. Although the embodiment demonstrates a PCI-E 216, the present embodiment considers that the block may also be a peripheral component interconnect (PCI) or a peripheral component interconnect extended (PCI-X) or an accelerated graphics port (AGP).

Additionally, an extended resource domain controller (XRDC) interconnect 220 can be connected to each of the access identifiers or access controls. The XRDC interconnect 220 can function as a filter to the bus interconnect 206 accesses by identifying the appropriate blocks connected to specific owners defined within the cohorts 102 as defined in FIG. 1. As defined, owners receive set resources to be associated with their systems and subsystems. The XDRC interconnect can function by blocking access to the connections until the appropriate resources have been identified and checked. Once the appropriate resources are identified, the XRDC will open access to the correct peripheral 208, memory 212, and PCI-E 216.

Figure 3:
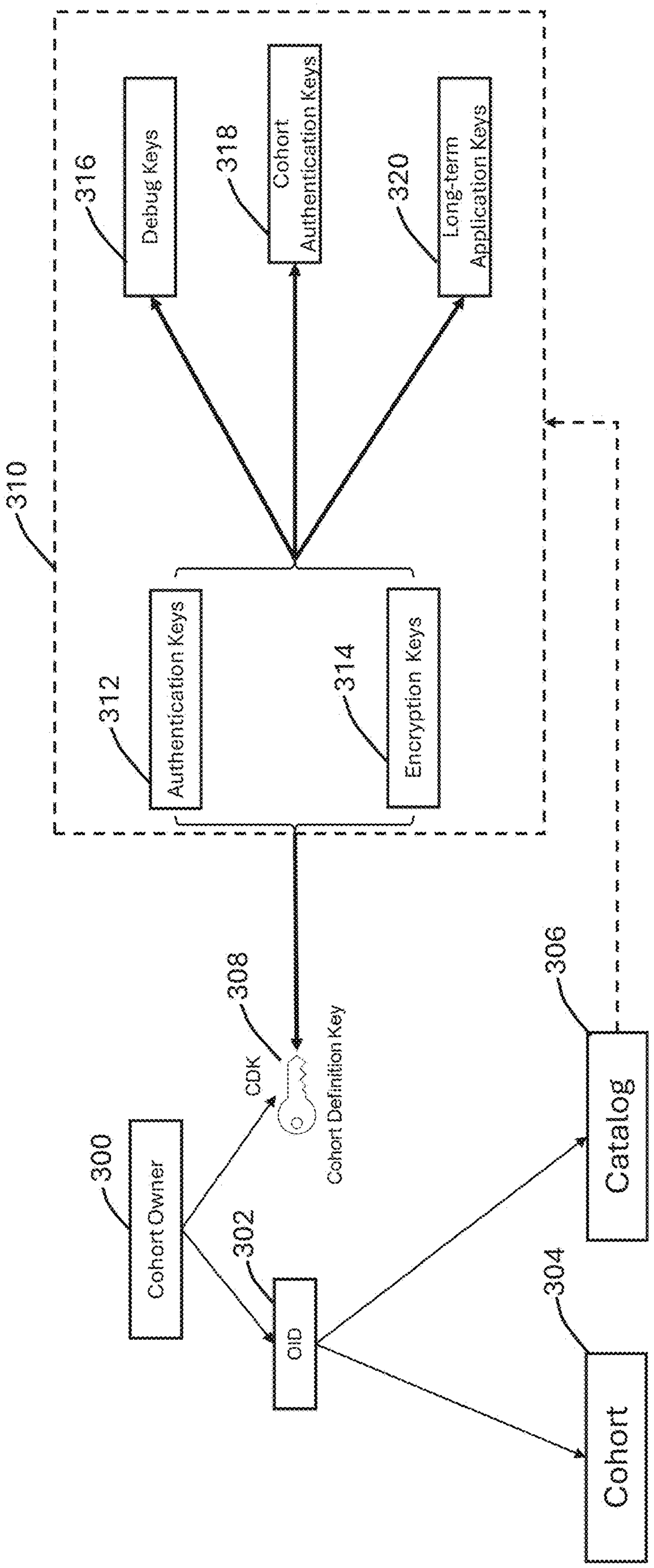
FIG. 3 shows a simplified block diagram of the keys and definitions that can be stored within the SoC and how they can relate to a cohort owner.

FIG. 3 shows a simplified block diagram of the keys and definitions that can be stored within the SoC (e.g., within a security controller of the SoC) and how they can relate to a cohort owner 300. According to the present disclosure, whenever there are multiple suppliers associated with a particular SoC, the resources of the SoC may need to be divided amongst the multiple owners. As previously described in association with FIG. 1, a cohort defines the division of resources of the SoC for a specific system and is associated with at least one supplier. Because there can be multiple suppliers, the shared resources and their related data need to be separated from one another to protect the personal and proprietary information of that system and owner. Therefore, keys and identifiers can be assigned and stored so as to ensure the only the correct owner can access their data, even when it is stored one the same SoC as one or more other owners.

As illustrated in FIG. 3, the cohort owner 300 can be defined by at least an owner identification (OID) 302 and a cohort definition key (CDK) 308. The OID 302 can be further associated with a cohort 304, defining the resources that are associated within the cohort 304. For each owner, there can be only one OID 302, however, an owner may be in control of more than one cohort 304 and therefore one OID 302 may be associated with multiple cohorts 304. Additionally, there can be a catalog 306, that is further associated with the OID and is used to store all of the keys associated with the cohort owner 300. The catalog 306 can store all of the rooted keys. The CDK 308 can be rooted in (i.e., generated and/or validated by or from) a variety of keys utilized to authorize and authenticate actions taken to access data stored by the system. According to the present disclosure, there are various provisioning keys, such as a plurality of authentication keys 312 and a plurality of encryption keys 314, that are both given to their respective owners and stored on the SoC for the authentication process.

Further rooted within the provision keys of the plurality of authentication keys 312 and plurality of encryption keys 314 can be keys established to authorize specific actions that the owners may want to perform. According to an exemplary embodiment, a plurality of debug keys 316 may be associated with the cohort owner 300 and associated with that owner's CDK 308. The plurality of debug keys 316 can be keys that are authenticated whenever a debugger is physically connected to the SoC. The plurality of debug keys 316 can act as a first authorization as it will be associated with the specific owner and give them initial access to the SoC. Further, the CDK 308 can have a plurality of cohort authentication keys 318, which act as a second step authentication in the debugger example. The plurality of cohort authentication keys 318 can act as the authorization for a debugger card for example, which will check that the appropriate access is being granted in connection to the specific areas that are associated with the cohort, meaning the associated SoC resources, and the cohort owner 300. The plurality of cohort authentication keys 318 and the plurality of debug keys 316 will be both given to the cohort owner 300 and stored within the system for encryption and authentication.

According to the present disclosure, there may be defined other long-term application keys 320 that can be used to access data within the SoC. For example, the present disclosure also considers that application keys can be formed and embedded in a non-volatile memory of the SoC for purposes of development and testing, firmware and software updates, calibration and configuration, maintenance tasks, certification and compliance testing, remote monitoring, and system upgrades may be some examples of future tasks associated with access system data. For these tasks, it can still remain important that data as between owners remains protected. The same principles can apply to these forms of secure access.

According to various embodiments, the cohort definition key 308 and the rooted keys 310 can comprise a variety of types of cryptographic keys. As non-limiting examples, the various keys can be advanced encryption standard (AES) keys (e.g., AES-256 bit keys), data encryption standard (DES) keys, triple DES keys, Rivest-Shamir-Adleman (RSA) keys, elliptic curve digital signature algorithm (ECDSA) keys, digital signature algorithm (DSA) keys, Rivest cipher 4 keys, and other forms of keys known to one of ordinary skill in the art. The cohort definition key 308 and the rooted keys 310 can comprise any number of bit lengths as applicable to the type of key being used. For example, if the cohort definition key 308 is an AES key, then it may have a 256 bit key length.

Figure 4:
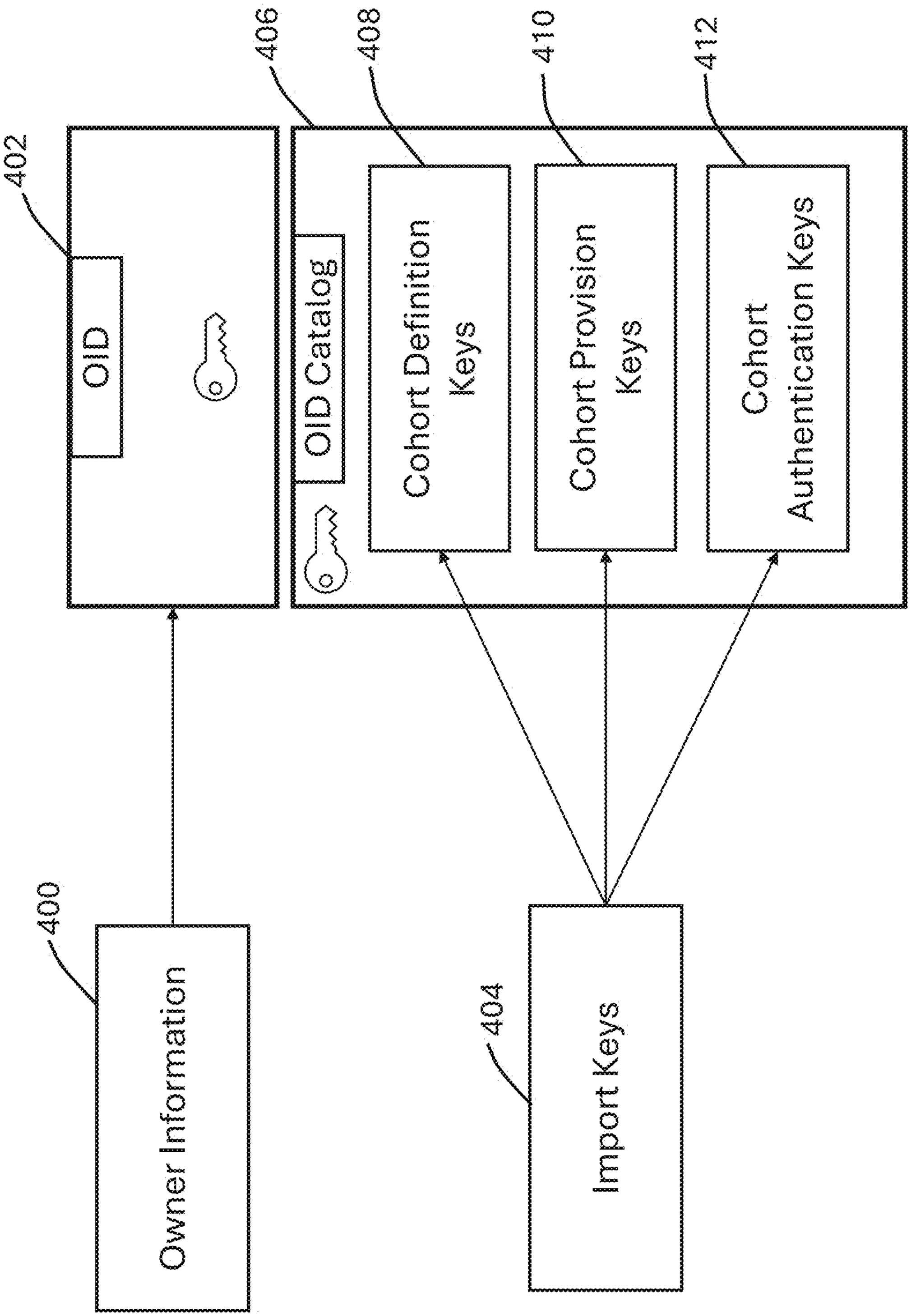
FIG. 4 shows a simplified block diagram of the method of importing the keys and identifications onto the SoC.

To enable proper operation of the SoC, the various authentication keys (FIG. 3) and the cohort definitions (FIG. 1) are loaded into as non-volatile memory of the SoC. To illustrate, FIG. 4 shows a simplified method flow for importing keys and cohort identifications onto an SoC. As a first step, owner information 400 can first be imported into the SoC in an owner identification configuration 402. The owner information can include the owner identification as described in FIG. 1 and an initial cohort definition key relevant to the assigned resources of that owner and cohort. A second step import keys 404 involves storing the various keys being imported and used to control debug access, as described herein, can occur at the initial stage of the SoC creation or at a later time, depending on the manufacturing process for the SoC. The import keys 404 could include cohort definition keys 408 under the same owner, cohort provision keys 410, and cohort authentication keys 412, as necessary. A reason that these keys can be imported at another time may be because any previous keys and identifications can be used as verification for the importation of new keys. For example, before the additional cohort definition keys 408 can be imported onto the SoC, the system and owner may need to verify the first cohort definition key that was imported under the first step of importing the owner information 400 to the owner information configuration 402. All subsequent keys that are imported can use any of the previously imported keys as a means to verify that they come from the appropriate owner or authorized user. In this manner, import keys 404 can be stored in a key catalog 406 and rooted in the initial cohort definition key. Therefore, the import keys 404 can be stored in accordance with a relevant cohort, or allocation of resources. The import keys 404 can be secure in their importation through the required verification from previously imported keys. Wherein, the import keys 404 can be either derived from the initial cohort definition key or the reference key can be provided at the time of import.

Figure 5:
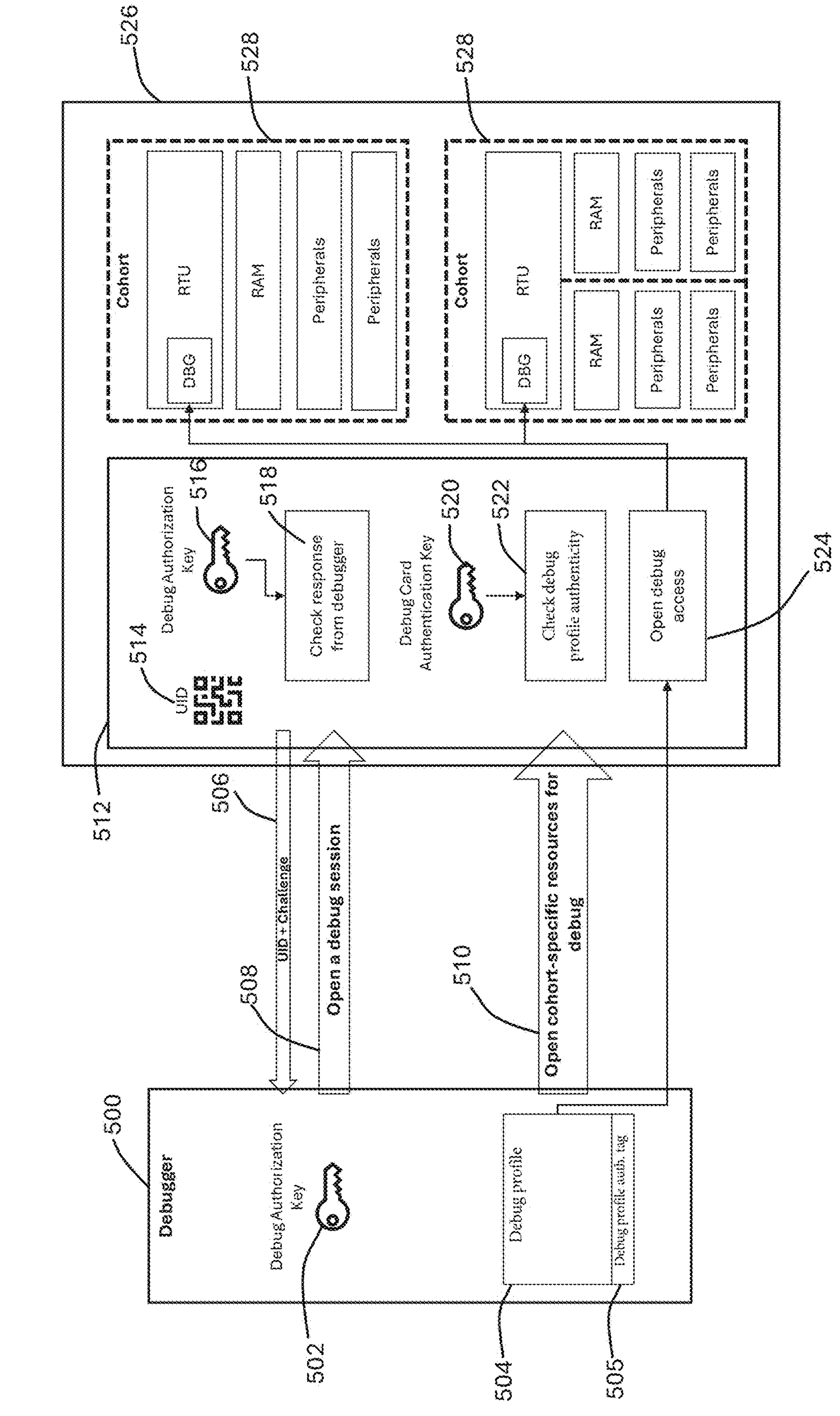
FIG. 5 shows a simplified block diagram of a debugger connection to an SoC according to an exemplary embodiment of the present disclosure.

FIG. 5 shows a simplified block diagram of a system including a debugger device connected to an SoC according to an exemplary embodiment of the present disclosure.

Debugger 500 may be a general purposes or special purposes computing device configured to be connected to (via a wired or wireless connection) and communicate with SoC 526 to initiate and open a debug session via communication 508 (e.g., transmission of an interrupt signal). Within communication 508, the debugger can transmit the first debug authorization key 502 via a debug port (e.g., either a wired or wireless communication) to SoC 526, which is used to begin the cohort debug session. The SoC 526 can have a unique identifier (UID) 514 that can be used to provide a challenge 506 back to the debugger 500 and further authenticate that the user that physically connected the debugger is an authorized owner of at least one cohort 528. When the debugger 500 opens a debug session via communication 508, the security controller 512 of the SoC 526 can also perform some initial security and authentication procedures. As such, utilizing its own stored second debug authorization key 516, stored in a catalog to check that the debug is initiated by an owner, the security controller 512 will compare the first debug authorization key 502 against its own stored debug authorization key 516. If this key is authenticated, based on the comparison, meaning the first debug authorization key 502 matches with the stored second debug authorization key 516, then the security controller 512 can then perform the challenge 506 and perform a check response 518 step. The debug session communication 508 and the challenge 506 accompanied with the actions performed by the security controller 512 represent a first initial authentication process that can authenticate that a user connecting a debugger 500 is an owner.

As part of a second authentication process, debugger 500 can then transmit a debug profile 504 which can open a cohort debug session 510, wherein the debug profile can request access to specific portions of the SoC 526. When a cohort debug session 510 is initiated, the security controller 512 can perform several authentication steps. The security controller 512 can first check the domains, meaning the specific resources that are assigned to a specific cohort 528, requested by the debug profile 504 utilizing the debug profile authentication key 520 (e.g., via authenticity tech 522) which identifies to the security controller 512 which resources or domains have been assigned to that cohort 528. The debug profile 504 in connection with a debug profile authentication tag 505 identify the domains that are to be accessed in the debug session and if they align with the debug profile authentication key 520 then the security controller 512 will open debug access 524. Once the debugger 500 has been granted access, debugger 500 is able to access the resources of cohort 528 to which debugger 500 has been granted access. Such resources may include various components and/or functions of the SoC 526 including CPU functionality (which may be provided by one or more predetermined cores), memory or regions of a memory such as a volatile (e.g., RAM) or non-volatile member of the SoC 526, and/or peripheral functions and components.

Figure 6:
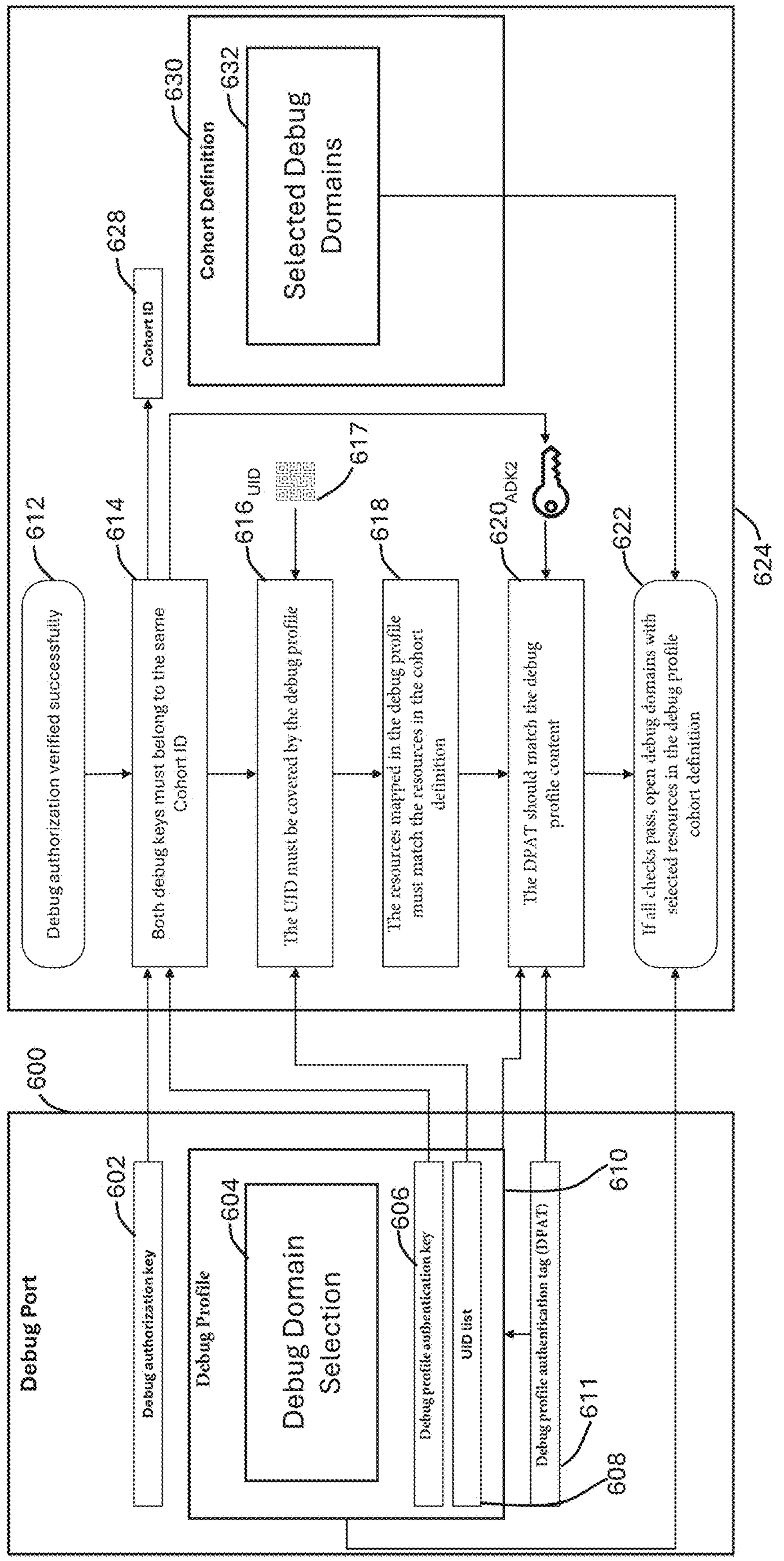
FIG. 6 shows a simplified block diagram and process flow of the second authentication process of FIG. 5.

FIG. 6 shows a simplified block diagram depicting a system and communication flow enabling execution of the second authentication process of FIG. 5 to determine an authenticity of and access rights given a particular debug profile. A debug port 600 enabling debugger to be connected (via wireless or wired connection) to SoC 624 to enable transmission of a debug authorization key 602 and a debug profile 610 from a debugger to SoC 624 via debug port 600. As described herein, debug profile 610 may further comprise a debug domain selection 604 that specifies the resources that the debug profile is requesting access to. The debug profile 610 can also include a debug profile authentication key 606 and a unique identifier list 608. According to an embodiment the debug profile can also not include the UID list 608 as it is an optional block that can add security. The debug port 600 and the associated blocks with it interact with the SoC 624 to provide debugging functions as described herein.

The debug port 600 can represent a physical debugger port where a debugger that may be a joint test action group (JTAG) debugger, a serial wire debug (SWD) debugger, and in-circuit emulator (ICE) debugger, a logic analyzer, oscilloscope, or other type of debugger can be connected for the testing or observing of a system-on-chip SoC circuit. Testing and observing the SoC can comprise a variety of purposes and can comprise code debugging, hardware debugging, real time monitoring, firmware development, system integration, performance operation, fault isolation and diagnostics, security testing, compliance validation, documentation, and a variety of other purposes that may be related to the testing and observing of an SoC.

When a debugger is connected to the debug port 600 a variety of actions can be taken by the SoC 624. A handshake can occur between the debugger and a security controller of the SoC 624, wherein the security controller can perform a protocol to establish a communication channel between the debugger and the SoC 624. As explained in FIG. 5, there can be a first authentication step 612, wherein the SoC 624 can verify that the debugger belongs to one of the owners of the SoC 624. In this step a cohort definition key can be provided, along with a challenge and other forms of verification.

A debug authentication key step 614 can follow the first authentication step 612, wherein the debug authorization key 602 and the debug profile authentication key 606 of the debugger in the debug port 600 can then be authenticated. One aspect of this authentication is that the SoC 624 can require that the debug authorization key 602 and the debug profile authentication key 606 belong to the same cohort ID 628. The cohort ID 628 can be a unique identifier that is not shared between the different cohorts and can be used as identification correlating to a specific set of the SoC's 624 resources. The various keys of authentication, including the cohort definition key, the debug authorization key 602 and other keys can be stored in such a manner as to be associated with specific cohorts and share the same cohort ID 628. Additionally, stored debug authorization keys can be used to verify the provided debug authorization key 602 and the debug profile authentication key 606 using various cryptographic operations, as described herein, to ensure that the keys match or are otherwise validated by the stored keys.

As a next step, the SoC 624 can perform a check on the debugger connected to the debug port 600. A check UID step 616 is performed wherein, a unique identifier (UID) 617 which can be unique to the SoC is checked and verified to confirm that the debugger and owner are correct. The check UID step 616 can be an optional step performed to provide added security to the data stored on the SoC 624. The unique identifier (UID) 617 can be stored on the SoC, where it can be compared to the UID provided by the unique identifier list 608 found on the debugger in the debug port 600.

The SoC 624 can then perform a domain request matching step 618, wherein, the debug profile 610 of the debugger connected to the debug port 600 can have the debug domain selection 604 that comprises a list of domains or resources that the debugger can request access to. The debug domain selection 604 should match the resources of a given cohort 630 and if it does then the debug profile authentication tag (DPAT) authentication step 620 step can occur. Once all checks and keys have been authenticated, the SoC 624 can modify the configuration of the SoC 624 to open the debug domains in an open domains step 622. Additionally, the SoC 624 can be modified to disallow access to resources that are not in the set or subset of requested resources.

According to various embodiments, the debugger connected to the debug port 600 can comprise a debug profile authentication tag 611. The debug profile authentication tag 611 can be a cryptographic value that can be used to authenticate the debug domain selection 604. The value of the debug profile authentication tag 611 can be calculated using the debug authentication key 602 which can be provided to the SoC 624 first. The debugger connected to the debug port 600 can calculate the value and then provide it to the SoC 624, where it can be provided to a security controller, calculated, and compared based on the debug authentication key 602. If the authentication is successful, the debugger signals can be given access to the selected debug domains 632 within the cohort 630 of the SoC 624.

Figure 7:
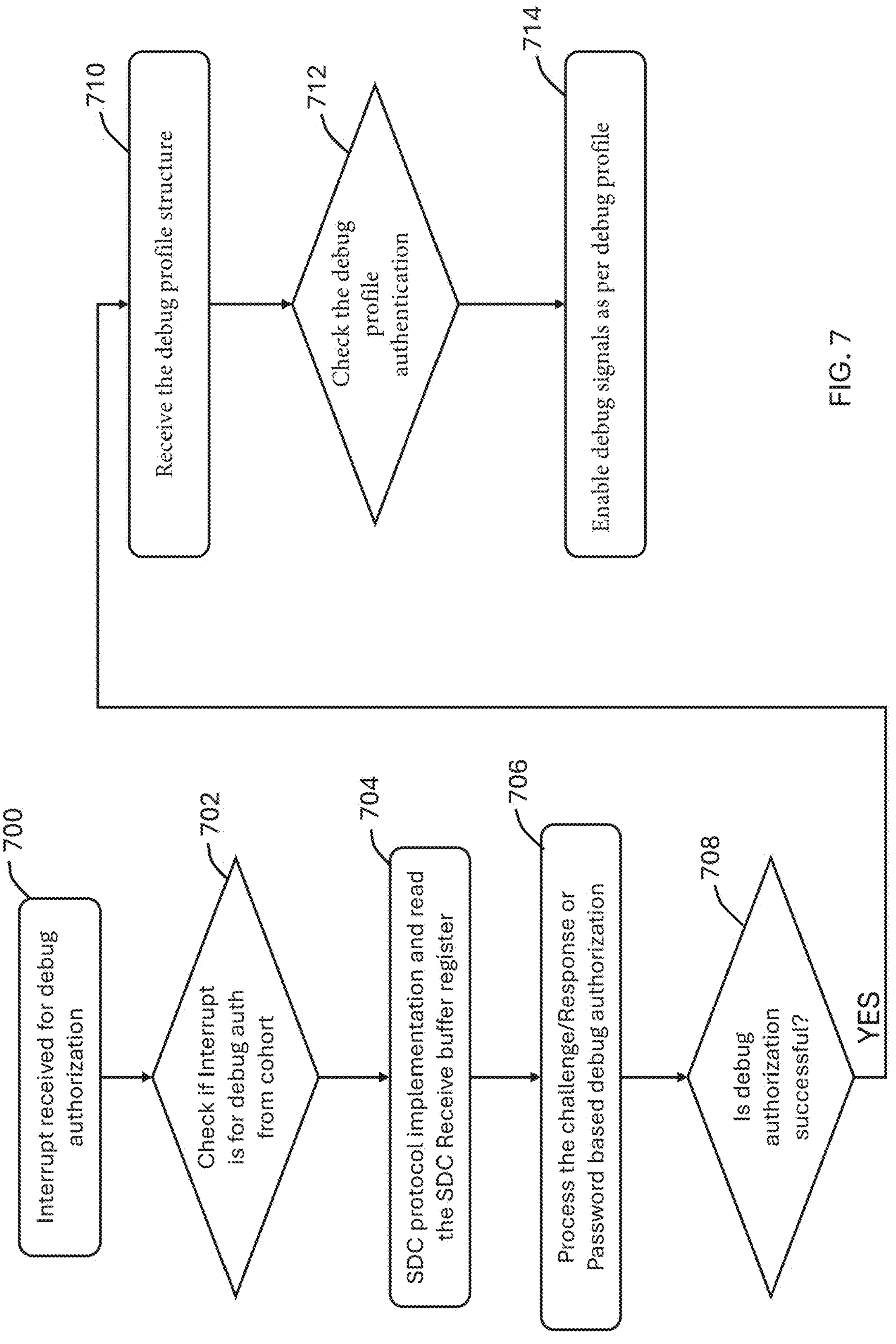
FIG. 7 shows a simplified process flow of the key authentication and debug profile authentication for a system-on-chip debugger connection.

FIG. 7 shows a simplified process flow of the key authentication and debug profile authentication for a system-on-chip debugger connection. A first step 700 occurs when an interrupt is received by the system signaling a stop to the operations of the SoC, wherein this can occur when a debugger is connected, or plugged into the debug port of an SoC and can be generated by a controller of the system-on-chip. The security controller or the central processing unit can detect the interrupt and make a determination of where and what type of interrupt has been initiated. For example, the type of interrupt can be a hardware interrupt, like a signal from a peripheral, or a software interrupt that comes from the controller.

A second step 702 can occur to determine that the interrupt signal came from a debugger connecting to the SoC that is seeking debug authorization. This can occur when a debugger is physically connected or attached to the SoC and requests authorization to access specific resources found on the SoC. When an interrupt is received by the circuit, an interconnect, such as the extended resource domain controller (XRDC) interconnect of FIG. 2 can reset the bus and block all of the bus accesses that would connect the debugger to the various blocks found in the circuit. These blocks can be memory, CPU, peripheral and other circuit component blocks. These blocks, according to the present disclosure are the resources that may be shared amongst the plurality of owners that share the SoC. The debugger can request access to specific portions of these blocks, including portions of the memory, or access to a peripheral, according to the present disclosure.

If the interrupt came from connecting a debugger for debug authorization, then a third step 704 can occur, wherein a serial debugging channel (SDC) protocol can begin and implement a communication channel between a security controller of the SoC and the debugger to perform an authentication process between the two. A SDC protocol can be stored on the chip, in the memory block for example, and begin a process of starting or pausing the execution of various functions found on the chip, including blocking all bus access by the debugger. The SDC protocol can also read the SDC receive buffer register and define and format any communication protocol according to a predetermined method. The protocol may also implement any initial debugging features that may be supported at this initial step. However, this would only be for any information not confidential or proprietary as amongst the owners.

Following the SDC protocol implementation step, a fourth step 706 wherein the SoC or the security controller of the SoC, according to various embodiments, can issue a challenge to the debugger and then process the response coming back from the debugger. The challenge to the debugger can include keys, passwords and also may include a unique identifier qualification in relation to the specific SoC that is connected to the debugger. The SoC may have a specific unique identifier assigned to it at after manufacturer in order to add an additional form of verification and protection. Additionally, a first cohort definition key, in relation to the cohort of the specific owner can be provided by the debugger and verified by the SoC and security controller.

After the challenge is provided by the security controller and the response is provided by the debugger connected to the debug port, the security controller can verify that the response is correct and that debug is authorized as a fifth step 708. If the authorization is successful, then this can act as a first gate for the owner and debugger to pass through. This can open the SoC to more specific debug requests, with specific resources and their data being requested as per the predetermined allocation of the resources amongst the owners. However, these requests can require additional verification and keys.

As a sixth step 710, after the debugger belonging to a specific owner receive authorization following a successful debug attempt, the debugger can provide a debug profile structure or a debug profile map to the security controller to be verified, including a request for access to specific resources associated with the cohort of the owner. The resources may include specific portions of the SoC and include portions of the CPU, memory, peripherals and other circuit components.

Once the security controller receives the debug profile structure from the debugger connected to the debug port, as a seventh step 712, the SoC and security controller can check the debug profile and authenticate that the requested resources are correct using a debug profile authentication key stored on the SoC. The debug profile structure or debug profile map, in order to be verified, must match the allocation of resources predetermined for the owner that is requesting access via the debugger. If the debug profile authentication is successful, then the eighth step 714 can occur, wherein the debug signals can be enabled as per the debug profile, and data can be provided to the correct owner. In other words, the debugger can access, through a bus interconnect, specific portions of the memory or CU or peripherals or any other resource found on the system-on-chip that has been authenticated to pertain to that owner and cohort. Wherein, the system-on-chip can be modified to allow the debugger access to the subset of resources and it can be modified to disallow debugger access to resources that do not correlate to the owner and cohort.

In some aspects, the techniques described herein relate to a system-on-chip device, including: a memory configured to store a cohort definition that identifies for each user of a plurality of users a subset of a set of resources of the system-on-chip that the user is authorized to access; a controller; a debug port configured to communicate, via a wired connection or a wireless connection, with a debugger computing device; a bus interconnect coupled to and configured to communicate data to the memory, the controller and the debug port; and a security controller coupled to the bus interconnect, wherein the security controller is configured to: receive, from the controller, an indication that the debugger computing device is connected to the debug port, receive, from the debug port, a user debug authorization key from the debugger computing device, determine, using the user debug authorization key, that the debugger computing device is associated with a first user of the plurality of users, receive, from the debug port, a user debug profile, wherein the security controller is configured to verify an authenticity of the user debug authorization key and the user debug profile by cryptographic operation, determine, using the user debug profile, a set of resources requested by the user, determine, using the cohort definition, that the set of requested resources includes resources associated with the user in the cohort definitions, and modify a configuration of the system-on-chip to allow the debugger computing device to access resources of the system-on-chip that are in the set of requested resources and to disallow the debugger computing device access to resources of the system-on-chip that are not in the set of requested resources based on the determination that the set of requested resources includes resources associated with the user in the cohort definitions using the cohort definition.

In some aspects, the techniques described herein relate to a system-on-chip device, wherein the set of resources include processor cores configured to implement one or more of a vehicle infotainment function, vehicle safety function, and vehicle engine management function.

In some aspects, the techniques described herein relate to a system-on-chip device, wherein the indication that the debugger computing device has been connected to the debug port includes receiving, by the controller and from the debug port, an interrupt signal.

In some aspects, the techniques described herein relate to a system-on-chip device, wherein the cohort definition is stored in a non-volatile memory of the system-on-chip.

In some aspects, the techniques described herein relate to a system-on-chip device, wherein the user debug authorization key includes an AES-256 bit key.

In some aspects, the techniques described herein relate to a system-on-chip device, wherein the security controller is configured to determine, using the user debug authorization key, that the debugger computing device is associated with the first user of the plurality users by validating the user debug authorization key using a stored user debug authorization key.

In some aspects, the techniques described herein relate to a system-on-chip device, wherein the cohort definition identifies, for each user of the plurality of users, a start-up image configured to determine a start-up initialization configuration of the system-on-chip device.

In some aspects, the techniques described herein relate to a system-on-chip device, including: a memory configured to store: a user identification for each user of a plurality of users; a cohort definition that identifies for each user of the plurality of users a subset of a set of resources of the system-on-chip that a corresponding user is authorized to access; a system-on-chip unique identifier; and a key catalog that includes authorization keys associated with each subset of resources of the system-on-chip for each user of the plurality of users; a controller; a debug port configured to communicate, via a wired connection or a wireless connection, with a debugger computing device; a bus interconnect coupled to the memory, the controller, and the debug port; and a security controller coupled to the bus interconnect, wherein the security controller is configured to: receive, via the debug port, an authorization key corresponding to a request to access a set of resources of the system-on-chip device; determine, using the key catalog stored in the memory, that the authorization key corresponds to at least one of the authorization keys of the key catalog; and modify a configuration of the system-on-chip to allow access to resources that are in the set of requested resources and to block access to resources of the system-on-chip that are not in the set of requested resources based on the determination.

In some aspects, the techniques described herein relate to a system-on-chip, wherein the set of resources include processor cores configured to implement vehicle infotainment functions, vehicle safety functions, and vehicle engine management.

In some aspects, the techniques described herein relate to a system-on-chip, wherein the user identification is stored in a non-volatile memory of the system-on-chip.

In some aspects, the techniques described herein relate to a system-on-chip, wherein the cohort definition is stored in a non-volatile memory of the system-on-chip.

In some aspects, the techniques described herein relate to a system-on-chip, wherein the authorization keys include AES-256 bit keys.

In some aspects, the techniques described herein relate to a system-on-chip, wherein the controller is configured to determine a start-up image that defines an initial configuration of each of the resources of the system-on-chip.

In some aspects, the techniques described herein relate to a system-on-chip, wherein the security controller is further configured to: receive, via the debug port, a unique identifier; and based on a comparison of the unique identifier and the system-on-chip unique identifier, modify the configuration of the system-on-chip to enable access to the set of requested resources.

In some aspects, the techniques described herein relate to a method, including: receiving, by a security controller of a system-on-chip and from a controller of the system-on-chip, an indication that a debugger computing device is connected to a debug port of the system-on-chip; receiving, via the debug port, a user debug authorization key from the debugger computing device; determining, using the user debug authorization key, that the debugger computing device is associated with a first user of a plurality of users; receiving, via the debug port, a user debug profile, wherein the user debug authorization key and the user debug profile are verified as authentic by the security controller of the system-on-chip; determining, using the user debug profile, a set of requested resources of the system-on-chip; determining, using a cohort definition, that the set of requested resources includes resources associated with the first user of the plurality of users in the cohort definitions; and modifying a configuration of the system-on-chip to allow the debugger to access resources of the set of requested resources that are in the set of requested resources and to disallow the debugger access to resources of the system-on-chip device that are not in the set of requested resources based on the determination that the set of requested resources includes resources associated with the first user of the plurality of users in the cohort definitions using the cohort definition.

In some aspects, the techniques described herein relate to a method, further including: receiving, by the security controller from the debug port, a unique identifier; determining that the unique identifier matches a system-on-chip unique identifier; and enabling the debugger computing device to access the requested resources.

In some aspects, the techniques described herein relate to a method, further including determining that the debugger computing device is connected to the debug port by detecting an interrupt signal from the controller.

In some aspects, the techniques described herein relate to a method, further including: storing, in a memory of the system-on-chip, a stored user debug authorization key; storing, in the memory of the system-on-chip, a stored user debug profile; and comparing, by the security controller, the user debug authorization key to the stored user debug authorization key and the user debug profile to the stored user debug profile to determine whether to enable the debugger computing device access to the set of requested resources.

In some aspects, the techniques described herein relate to a method, further including: determining a start-up image that defines a start-up configuration of the system-on-chip; and configuring the security controller and a memory of the system-on-chip device according to the start-up image.

In some aspects, the techniques described herein relate to a method, further including: receiving, from the debug port, a debug authentication key; determining, based on a comparison of the debug authentication key to the user debug authorization key, that the debugger computing device is authorized to request access to the system-on-chip; and modifying the configuration of the system-on-chip to allow the debugger access to the requested resources of the system-on-chip based on the determination that the debugger computing device is authorized to request access to the system-on-chip.

As will be appreciated by one skilled in the art, aspects of the present disclosure may be embodied as a system, process, method, and/or program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM"), a read-only memory ("ROM"), an erasable programmable read-only memory ("EPROM" or flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

The block diagrams in the figures illustrate architecture, functionality, and operation of possible implementations of circuitry, systems, methods, processes, and program products according to various embodiments of the present disclosure. In this regard, certain blocks in the block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams, and combinations of blocks in the block diagrams, can be implemented by special purpose hardware-based systems (e.g., which may include one or more graphics processing units) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, application specific ICs, microcontrollers, systems on a chip, general purpose processors, microprocessors, or the like.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed:

1. A system-on-chip device, comprising:
- a memory configured to store a cohort definition that identifies for each user of a plurality of users a subset of a set of resources of the system-on-chip that the user is authorized to access;
- a controller;
- a debug port configured to communicate, via a wired connection or a wireless connection, with a debugger computing device;
- a bus interconnect coupled to and configured to communicate data to the memory, the controller and the debug port; and
- a security controller coupled to the bus interconnect, wherein the security controller is configured to:
  - receive, from the controller, an indication that the debugger computing device is connected to the debug port,
  - receive, from the debug port, a user debug authorization key from the debugger computing device,
  - determine, using the user debug authorization key, that the debugger computing device is associated with a first user of the plurality of users,
  - receive, from the debug port, a user debug profile, wherein the security controller is configured to verify an authenticity of the user debug authorization key and the user debug profile by cryptographic operation,
  - determine, using the user debug profile, a set of resources requested by the user,
  - determine, using the cohort definition, that the set of requested resources includes resources associated with the user in the cohort definitions, and
  - modify a configuration of the system-on-chip to allow the debugger computing device to access resources of the system-on-chip that are in the set of requested resources and to disallow the debugger computing device access to resources of the system-on-chip that are not in the set of requested resources based on the determination that the set of requested resources includes resources associated with the user in the cohort definitions using the cohort definition.

2. The system-on-chip device of claim 1, wherein the set of resources include processor cores configured to implement one or more of a vehicle infotainment function, vehicle safety function, and vehicle engine management function.

3. The system-on-chip device of claim 1, wherein the indication that the debugger computing device has been connected to the debug port includes receiving, by the controller and from the debug port, an interrupt signal.

4. The system-on-chip device of claim 1, wherein the cohort definition is stored in a non-volatile memory of the system-on-chip.

5. The system-on-chip device of claim 1, wherein the user debug authorization key comprises an AES-256 bit key.

6. The system-on-chip device of claim 1, wherein the security controller is configured to determine, using the user debug authorization key, that the debugger computing device is associated with the first user of the plurality users by validating the user debug authorization key using a stored user debug authorization key.

7. The system-on-chip device of claim 1, wherein the cohort definition identifies, for each user of the plurality of users, a start-up image configured to determine a start-up initialization configuration of the system-on-chip device.

8. A system-on-chip device, comprising:
- a memory configured to store:
  - a user identification for each user of a plurality of users;
  - a cohort definition that identifies for each user of the plurality of users a subset of a set of resources of the system-on-chip that a corresponding user is authorized to access;
  - a system-on-chip unique identifier; and
  - a key catalog that includes authorization keys associated with each subset of resources of the system-on-chip for each user of the plurality of users;
- a controller;
- a debug port configured to communicate, via a wired connection or a wireless connection, with a debugger computing device;
- a bus interconnect coupled to the memory, the controller, and the debug port; and
- a security controller coupled to the bus interconnect, wherein the security controller is configured to:
  - receive, via the debug port, an authorization key corresponding to a request to access a set of resources of the system-on-chip device;
  - determine, using the key catalog stored in the memory, that the authorization key corresponds to at least one of the authorization keys of the key catalog; and
  - modify a configuration of the system-on-chip to allow access to resources that are in the set of requested resources and to block access to resources of the system-on-chip that are not in the set of requested resources based on the determination.

9. The system-on-chip of claim 8, wherein the set of resources include processor cores configured to implement vehicle infotainment functions, vehicle safety functions, and vehicle engine management.

10. The system-on-chip of claim 8, wherein the user identification is stored in a non-volatile memory of the system-on-chip.

11. The system-on-chip of claim 8, wherein the cohort definition is stored in a non-volatile memory of the system-on-chip.

12. The system-on-chip of claim 8, wherein the authorization keys comprise AES-256 bit keys.

13. The system-on-chip of claim 8, wherein the controller is configured to determine a start-up image that defines an initial configuration of each of the resources of the system-on-chip.

14. The system-on-chip of claim 8, wherein the security controller is further configured to:
- receive, via the debug port, a unique identifier; and
- based on a comparison of the unique identifier and the system-on-chip unique identifier, modify the configuration of the system-on-chip to enable access to the set of requested resources.

15. A method, comprising:

receiving, by a security controller of a system-on-chip and from a controller of the system-on-chip, an indication that a debugger computing device is connected to a debug port of the system-on-chip;

receiving, via the debug port, a user debug authorization key from the debugger computing device;

determining, using the user debug authorization key, that the debugger computing device is associated with a first user of a plurality of users;

receiving, via the debug port, a user debug profile, wherein the user debug authorization key and the user debug profile are verified as authentic by the security controller of the system-on-chip;

determining, using the user debug profile, a set of requested resources of the system-on-chip;

determining, using a cohort definition, that the set of requested resources includes resources associated with the first user of the plurality of users in the cohort definitions; and modifying a configuration of the system-on-chip to allow the debugger computing device to access resources of the set of requested resources that are in the set of requested resources and to disallow the debugger computing device access to resources of the system-on-chip device that are not in the set of requested resources based on the determination that the set of requested resources includes resources associated with the first user of the plurality of users in the cohort definitions using the cohort definition.

16. The method of claim 15, further comprising:

receiving, by the security controller from the debug port, a unique identifier;

determining that the unique identifier matches a system-on-chip unique identifier; and enabling the debugger computing device to access the requested resources.

17. The method of claim 15, further comprising determining that the debugger computing device is connected to the debug port by detecting an interrupt signal from the controller.

18. The method of claim 15, further comprising:

storing, in a memory of the system-on-chip, a stored user debug authorization key;

storing, in the memory of the system-on-chip, a stored user debug profile; and comparing, by the security controller, the user debug authorization key to the stored user debug authorization key and the user debug profile to the stored user debug profile to determine whether to enable the debugger computing device access to the set of requested resources.

19. The method of claim 15, further comprising:

determining a start-up image that defines a start-up configuration of the system-on-chip; and configuring the security controller and a memory of the system-on-chip device according to the start-up image.

20. The method of claim 15, further comprising:

receiving, from the debug port, a debug authentication key;

determining, based on a comparison of the debug authentication key to the user debug authorization key, that the debugger computing device is authorized to request access to the system-on-chip; and modifying the configuration of the system-on-chip to allow the debugger computing device access to the requested resources of the system-on-chip based on the determination that the debugger computing device is authorized to request access to the system-on-chip.

* * * * *